United States Patent

[11] 3,603,550

[72] Inventor Clarence D. Byrd
       Colfax, N.C.
[21] Appl. No. 866,295
[22] Filed Oct. 14, 1969
[45] Patented Sept. 7, 1971
[73] Assignee Lacy J. Miller Machine Company, Inc.
       Welcome, N.C.

[54] QUICK RELEASE SUPPORT
     10 Claims, 5 Drawing Figs.
[52] U.S. Cl. .................................................. 248/313,
     211/71, 248/154
[51] Int. Cl. ...................................................... A62c 33/00
[50] Field of Search ........................................... 248/313,
     316, 316 B, 154, 146, 226, 226 C; 211/71, 75, 88;
     169/1

[56] References Cited
UNITED STATES PATENTS

| 286,113 | 10/1883 | Burk | 248/316 |
|---|---|---|---|
| 2,579,878 | 12/1951 | Stone | 248/316 |
| 3,033,405 | 5/1962 | Adell | 248/313 |
| 3,204,775 | 9/1965 | Smith et al. | 211/75 |

FOREIGN PATENTS

| 277,283 | 8/1951 | Switzerland | 248/313 |

*Primary Examiner*—J. Franklin Foss
*Attorney*—David Rabin

ABSTRACT: A quick release support for emergency equipment or the like wherein a dog member is biased into wedging engagement between pivotably mounted lugs secured to jaws which clamp an object therebetween. A release handle is actuated to disengage the dog from the lugs permitting the clamping jaws to open and release the object.

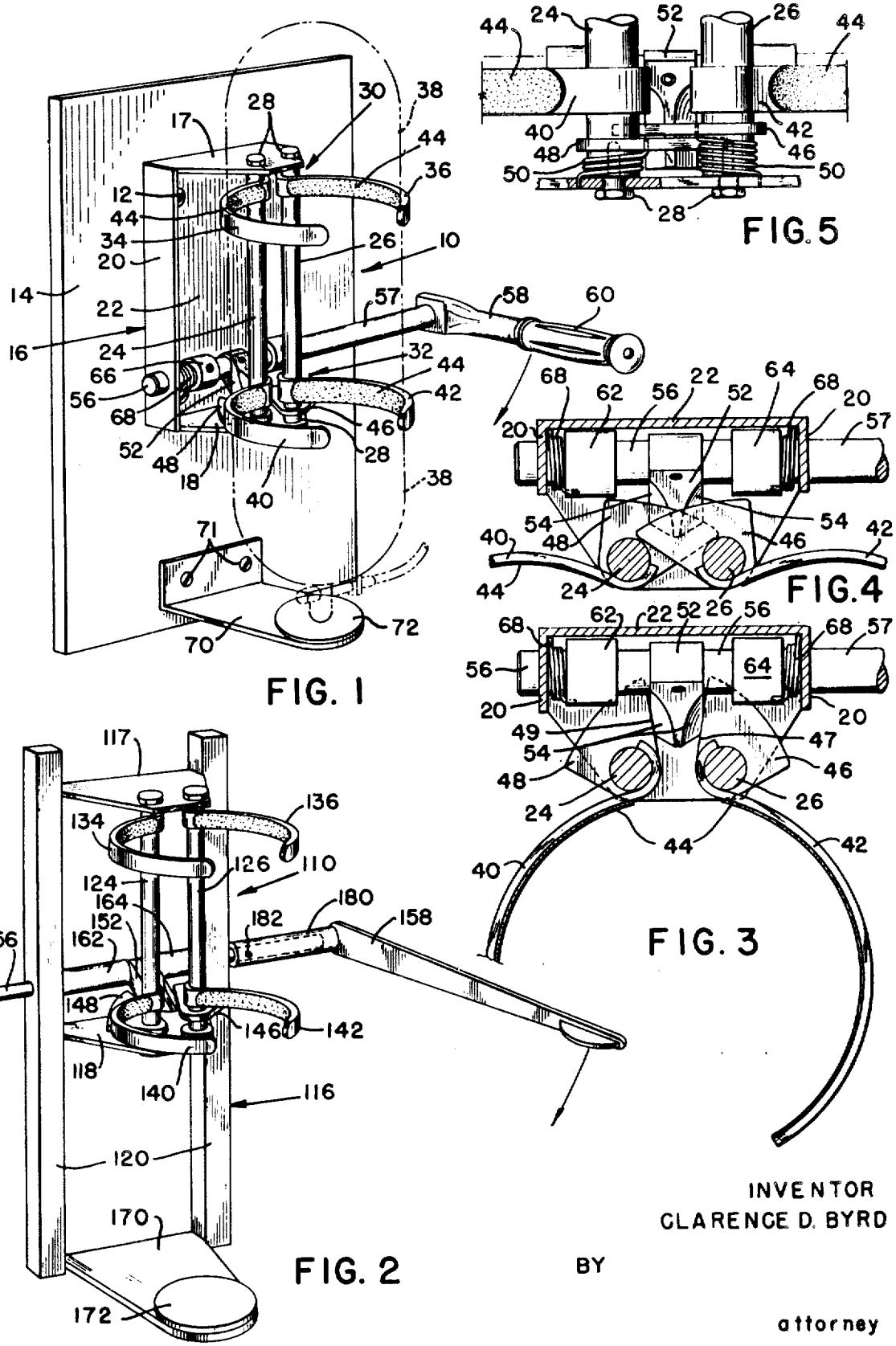

QUICK RELEASE SUPPORT

BRIEF SUMMARY AND OBJECTS OF THE INVENTION

The present invention relates to quick release supports and more particularly to supports for holding safety or emergency equipment in a convenient manner which makes it possible to release such equipment quickly for action or use without delay or accident.

The invention is especially adapted for supporting equipment such as an oxygen tank, fire extinguisher etc., where it is necessary that such equipment be quickly released when the occasion for oxygen release arises. The quick release support can be readily secured to a safety or rescue vehicle for securely positioning various pieces of emergency or safety equipment in a position to be readily released and carried by the person who is to use such equipment. For example, the oxygen tank of a breathing apparatus may be latched against accidental displacement or removal from the quick release support mounted on the seat of a rescue vehicle. The seat occupant dons the breathing apparatus harness en route to a fire or accident and upon arrival at the scene quickly releases the oxygen tank upon dismounting from the vehicle seat be actuating a release handle.

Briefly, the present invention includes pairs of jaws pivotably mounted upon a frame for partially encircling and clamping an object. The jaws are secured to spaced, parallel rods provided with overlapping lugs at the lower ends thereof. The jaws are normally urged into clamped engagement with the object by a dog member pivotable in a plane intermediate the parallel rods which wedges between the lugs. The dog is secured to a handle actuated rotatable shaft which is spring-biased normally to urge the dog into wedging engagement between the lugs. Light springs bias the pair of jaws outwardly to release the object upon actuation of the dog member releasing handle. The frame may be conveniently mounted upon a wall bracket, post, vehicle seat, or other suitable structures.

One of the primary objects of the invention is a quick release support for a device to be removed and replaced frequently and readily in position.

Another object of the invention is the provision of a support having a locking means for preventing accidental displacement or removal of an object therefrom until released.

Still another object of the invention is to provision of a simple, practical and efficient quick release support for safety or emergency equipment.

Other objects and advantages of the invention will become apparent from a consideration of the following detailed description taken in conjunction with the accompanying drawings.

BRIEF DESCRIPTION OF THE FIGURES

FIG. 1 is a perspective view of the quick release support in closed position for supporting a tank shown in broken-line configuration;

FIG. 2 is a perspective view of the quick release support similar to FIG. 1, illustrating a modified frame and release handle;

FIG. 3 is a fragmentary sectional view of the support illustrating the handle actuated dog member wedging the lugs and jaws to a closed position;

FIG. 4 is a fragmentary sectional view similar to FIG. 3 with the lugs and jaws in an open position; and FIG. 5 is a fragmentary front elevational view of the dog member and the overlapping lugs.

DETAILED DESCRIPTION OF THE INVENTION

Referring now to the drawing and particularly to FIG. 1, reference numeral 10 designates the quick release support mounted on a frame or other suitable support structure 14.

The support 10 comprise a generally rectangular frame 16 having upstanding end plates 17, 18 and sideplates 20, 20 secured to a baseplate 22. The frame 16 is secured to the structure 14 by fasteners 12 extending through openings provided in the baseplate 22. A pair of parallel vertical rods 24, 26 extend between the vertically spaced plates 17, 18 of frame 16 for supporting clamping assemblies 30, 32. Fasteners 28, passing through openings, not clearly shown, provided in the forward edges of the plates 17 and 18, are threadably received within rods 24, 26 for pivotably mounting the rods on the plates 17 and 18.

Upper and lower pivotable clamping assemblies 30, 32 are mounted on the spaced, parallel rods 24, 26 adjacent the plates 17, 18. The upper clamping assembly 30 includes a pair of arcuate-shaped jaws 34, 36 rigidly secured to the spaced rods 24, 26, respectively, to support an oxygen tank 38 or other article. The lower clamping assembly 32 includes a pair of jaws 40, 42, similar to jaws 34, 36 for releasably gripping the lower section of tank 38. Padding 44 which may be of rubber or other suitable frictional or nonslipping material is provided on the inner surfaces of jaws 34, 36, 40, 42 for applying a strong gripping or nonslipping force to the tank 38. The padding 44 also serves as a protection against marring of the finish of the clamped tank 38.

A pair of generally fan-shaped lugs or cams 46, 48, positioned below the clamping assembly 32, are fixedly secured to rods 26 and 24, respectively, The lugs 46, 48 extend rearwardly behind the rods 24, 26 toward the baseplate 22, one above the other so as to overlap, as shown by FIG. 4, when the clamping jaws 40, 42 are in an open or nonclamping position. Light coil springs 50, 50, shown in FIG. 5, are positioned below lugs 46, 48, respectively, for applying a biasing force to the rigidly secured rods, lugs and jaws tending to open the jaws. The springs 50, provided around rods 24, 26 have one end secured to the plate 18 and the other end connected to lugs 46, 48 for urging the opposed pivotable jaws 34, 36, 40, 42 away from each other to the open position as shown by FIG. 4.

A dog member 52, positioned rearwardly of the lugs 46, 48, is mounted for reciprocation between a position disengaged from the lugs, substantially as shown by FIG. 4, to a position intermediate the pivotable lugs 46, 48 as shown by FIG. 3 for wedging the lugs apart and urging the jaws toward each other to clamp an object therebetween. The forward edge of dog member 52 comprises tapered surfaces 54 for applying a wedging action to the surfaces 47, 49 of lugs 46, 48 respectively. The dog member 52 is fixedly mounted on a horizontally disposed shaft 56 that extends through openings provided in the opposed sideplates 20, 20 of the frame 16. The shaft is capable of being rotated within the sideplates 20, 20 by a handle 58 having a handgrip element 60 which is secured to an extended portion 57 of shaft 56. A pair of spaced collars 62, 64 are secured to the shaft 56 for rotation therewith by setscrews 66 or other fasteners to prevent axial displacement of the shaft 56 from the sideplates 20, 20. A relatively strong coil-type spring 68, located between collars 62, 64 and their associated sideplates 20, 20, has the ends thereof secured within openings, not shown, provided within the collars 62, 64 and the shaft 56, for biasing the shaft and handle 58 upwardly thereby urging the dog member 52 into engagement with the pivotable lugs 46, 48. The force applied by the springs 68 urging the dog member 52 into engagement with the lugs 46, 48 and the force required to rotate the handle 58 to release the dog 52 may be adjusted by varying the rotational position of the collars 62, 64 on the shaft 56.

As shown by FIG. 1, a foot member 70 is be adjustably positioned below the tank 38 to support the tank and facilities repositioning of the tank the jaws 34, 36, 40 and 42. The foot member 70 is secured by fasteners 71 to the structure 14 or other suitable support and has a friction pad 72 on the outer end thereof adapted to frictionally engage the tank 38.

The tank 38 may be easily and conveniently released from the clamping jaws by moving the handle 58 downwardly in the direction of the arrow, FIG. 1, overcoming the bias of springs 68 to pivot dog member 52 away from lugs 46, 48 permitting the jaws to open as the tank is removed therefrom. Alternatively, the jaws on only one of the rods 24, 26 may be moved to an open position as the handle 58 is depressed, depending upon the manner and direction of displacement of the tank 38 from the support 10. The tank may be repositioned within the clamping jaw by (1) depressing the handle, locating the tank approximately in the correct position and manually pivoting the jaws until they engage the tank 38, or by (2) positioning the tank on foot member 70 and manually pulling the jaws to clamping engagement with the tank.

The handle 58 can be mounted on either side of the quick release support 10, without modification, merely by releasing the collars 62, 64, springs 68 and dog member 52 from the shaft 56, removing the shaft from the sideplates 20, 20 and reinserting shaft 56 into the plates form the outer side of the support and resecuring the springs, collars and dog member to the shaft.

FIG. 2 illustrates a quick release support 110 having a modified generally rectangular frame 116 and a modified release handle 158. The frame 116 comprises a pair of spaced, vertical rectangular bars 120, 120 having plates 117 and 118 secured thereto as by welding or other suitable securing means. Plate 117 is located adjacent the uppermost extent of bars 120 and plate 118 is spaced below plate 117 intermediate the ends of bars 120 for pivotably supporting the rods 124, 126, jaws 134, 136, 140, 142 and lugs 146, 148 as previously described in the embodiment of FIG. 1. A shaft 156, having end portions extending through bars 120, is spring biased to urge the dog member 152 into engagement with lugs 146, 148 similar to the embodiment of FIG. 1. Coil springs, (not shown) similar to springs 68 of FIG. 1, surround shaft 156 and are enclosed within collars 162, 164 and are secured to the shaft. Opposed ends of the springs are secured to the frame 116 and the collars, respectively, to bias the dog 152 into wedging engagement with lugs 146, 148. Springs, similar to springs 50 of FIG. 5, are provided below lugs 146, 148 normally urge the lugs toward each other to open the jaws.

The elongated handle 158 has a tubular member 180 disposed at right angles thereto which is adapted to be secured to either end portion of the rotatable shaft 156. The handle 158 and tubular member 180 are adjustably secured to the shaft by a fastener 182.

A support foot member 170 and pad 172 are secured to the lower extremities of the spaced vertical bars 120, 120 to facilitate reloading of an object within the jaws 134, 136, 140, and 142.

I claim:
1. A quick release support for breathing apparatus including an oxygen tank adapted to be strapped to the back of a rescue worker, said support comprising: a frame adapted to be mounted upon a support structure, a pair of vertically disposed support means secured to said frame for rotation about vertical axes, oppositely disposed jaws secured to said rotatable support means for releasably clamping a tank therebetween, a lug secured to each of said rotatable support means, said lugs being located in vertically spaced parallel planes and pivotably mounted means displaceable in a vertical plane from a first position in wedging engagement with said lugs for urging said jaws to be locked, clamping position, into a second unlocked position spaced beyond said lugs for permitting said jaws to pivot to an open position and said lugs to pivot an overlapped position.

2. A quick release support as recited in claim 1, said rotatable support means comprising elongated, spaced parallel rods secured adjacent each end thereof to said frame.

3. A quick release support as defined in claim 2, wherein said oppositely disposed jaws includes pairs of vertically spaced arcuate members secured to said parallel rods.

4. A quick release support as defined in claim 3, further including friction means secured to the inner portions of said jaws.

5. A quick release support as defined in claim 2, wherein each of said lugs comprising a member extending radially from each of said spaced, parallel rods.

6. A quick release support as defined in claim 5, said lug members being secured to said rods in spaced, parallel relation for movement from an overlapping position to a laterally separated position.

7. A quick release support as defined in claim 1, wherein said jaws and said lugs are secured to said rotatable means in vertically spaced, parallel relation.

8. A quick release support as defined in claim 1, said pivotably mounted means including a dog member secured to a horizontally disposed shaft supported by said frame, and spring means for biasing said dog member into wedging engagement with said lugs to pivot said jaws to said first position.

9. A quick release support as defined in claim 1, further including means for biasing said jaws to an open position when said pivotably mounted means is in said second position.

10. A quick release support as defined in claim 1, further including a foot member vertically spaced below said jaws to facilitate repositioning of an object within said jaws.